(12) United States Patent
Sundström et al.

(10) Patent No.: US 8,219,056 B2
(45) Date of Patent: Jul. 10, 2012

(54) RADIO ENVIRONMENT SCANNER

(75) Inventors: Lars Sundström, Lund (SE); Thomas Olsson, Karlshamn (SE); Leif Wilhelmsson, Dalby (SE); Chester Park, Durham, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 365 days.

(21) Appl. No.: 12/553,710

(22) Filed: Sep. 3, 2009

(65) Prior Publication Data

US 2011/0053539 A1 Mar. 3, 2011

(51) Int. Cl.
*H04B 17/00* (2006.01)
*H04K 3/00* (2006.01)

(52) U.S. Cl. .................................. 455/226.1; 455/295

(58) Field of Classification Search ............... 455/226.1, 455/295, 296
See application file for complete search history.

(56) References Cited

U.S. PATENT DOCUMENTS

| | | | |
|---|---|---|---|
| 6,670,901 B2 * | 12/2003 | Brueske et al. | 341/139 |
| 7,295,813 B2 | 11/2007 | Haub et al. | |
| 7,346,134 B2 | 3/2008 | Smith | |
| 2005/0040894 A1 | 2/2005 | Heinonen et al. | |
| 2006/0109939 A1 | 5/2006 | Ciccarelli et al. | |
| 2009/0086863 A1 | 4/2009 | Komninakis et al. | |
| 2009/0122910 A1 | 5/2009 | Wen et al. | |
| 2009/0130989 A1 | 5/2009 | Rousu et al. | |

FOREIGN PATENT DOCUMENTS

| | | |
|---|---|---|
| EP | 2066049 A1 | 6/2009 |
| WO | WO 2009/025425 | 2/2009 |

* cited by examiner

*Primary Examiner* — Lee Nguyen
(74) *Attorney, Agent, or Firm* — Potomac Patent Group PLLC

(57) ABSTRACT

A device may include a measurement receiver, a communication receiver, and a transmitter. The measurement receiver may include a receiver (RX) down-conversion component to receive an amplified signal from a low-noise amplifier of the communication receiver, selectively receive a signal from a first local oscillator associated with the communication receiver or a second local oscillator associated with the transmitter, and down-convert the amplified signal to baseband using the received signal from the first local oscillator or the second local oscillator. The measurement receiver may further include a delta-sigma analog-to-digital converter (ADC) to provide low quantization noise only for a particular frequency range to be measured, and a control component to configure the delta-sigma ADC to provide the low quantization noise at the particular frequency range.

20 Claims, 11 Drawing Sheets

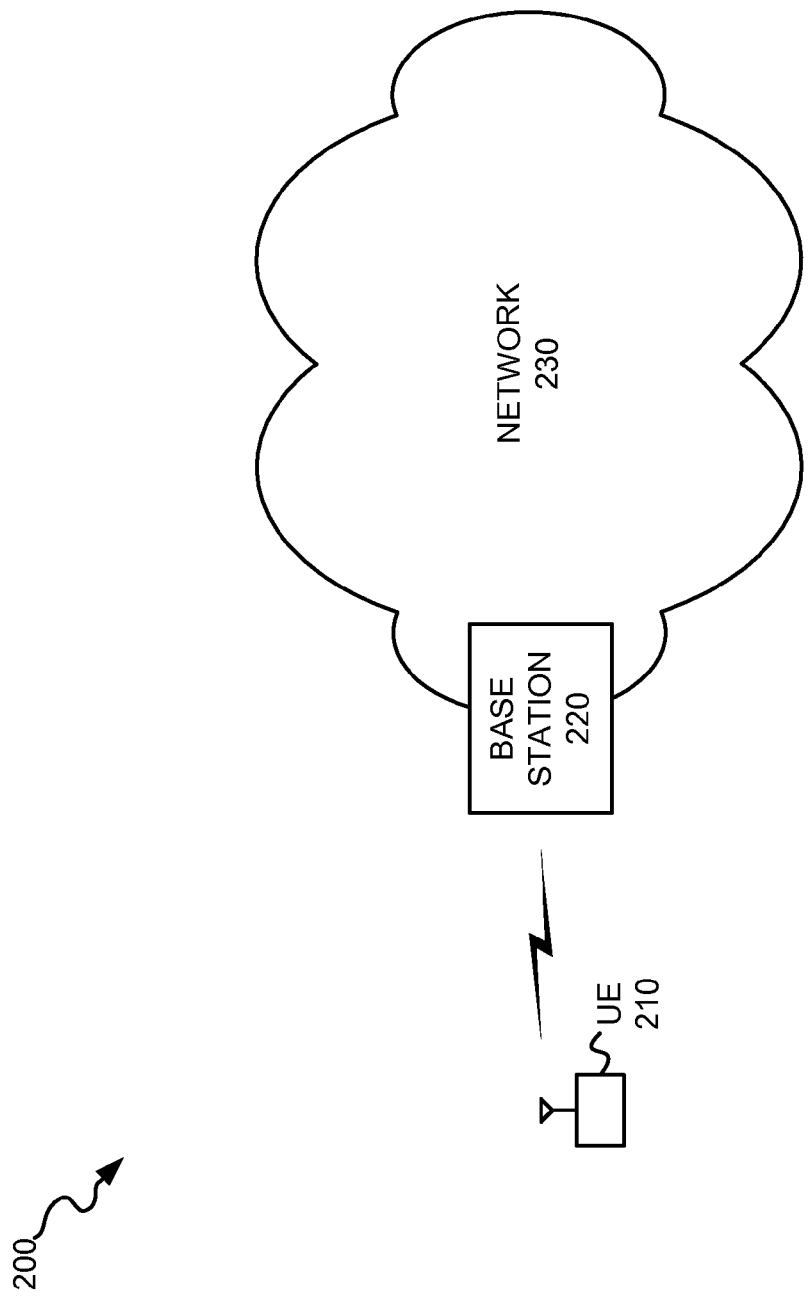

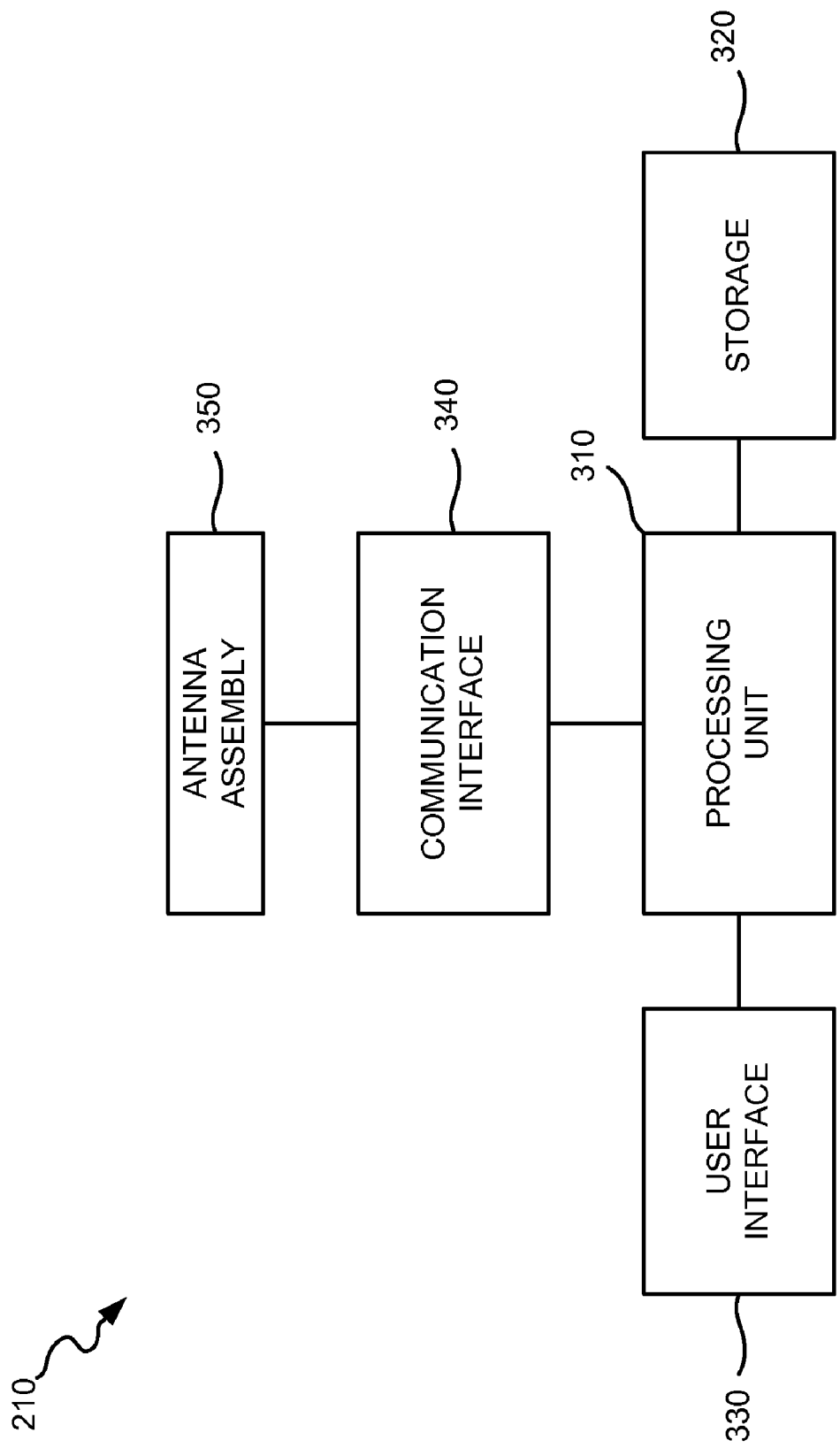

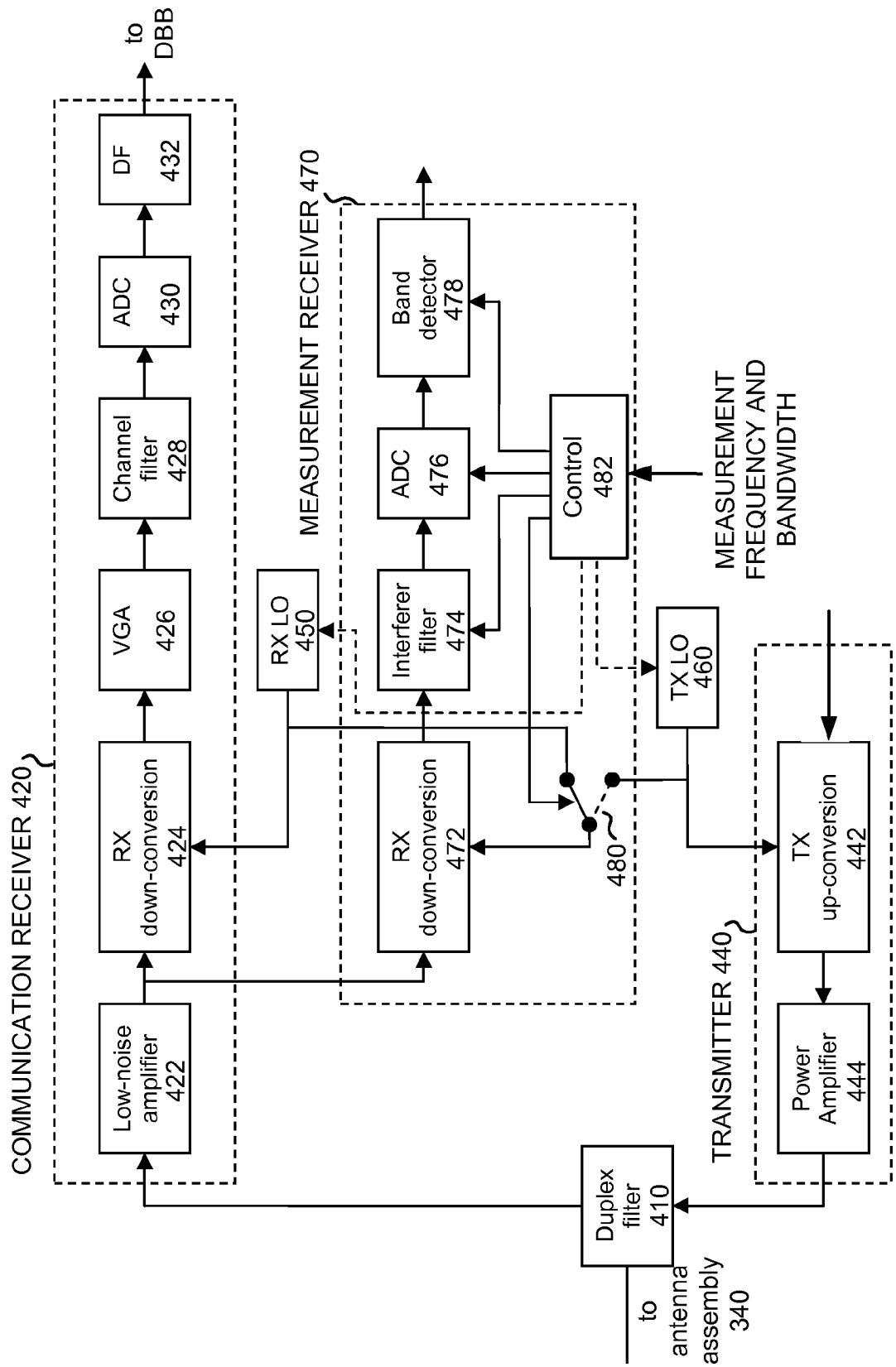

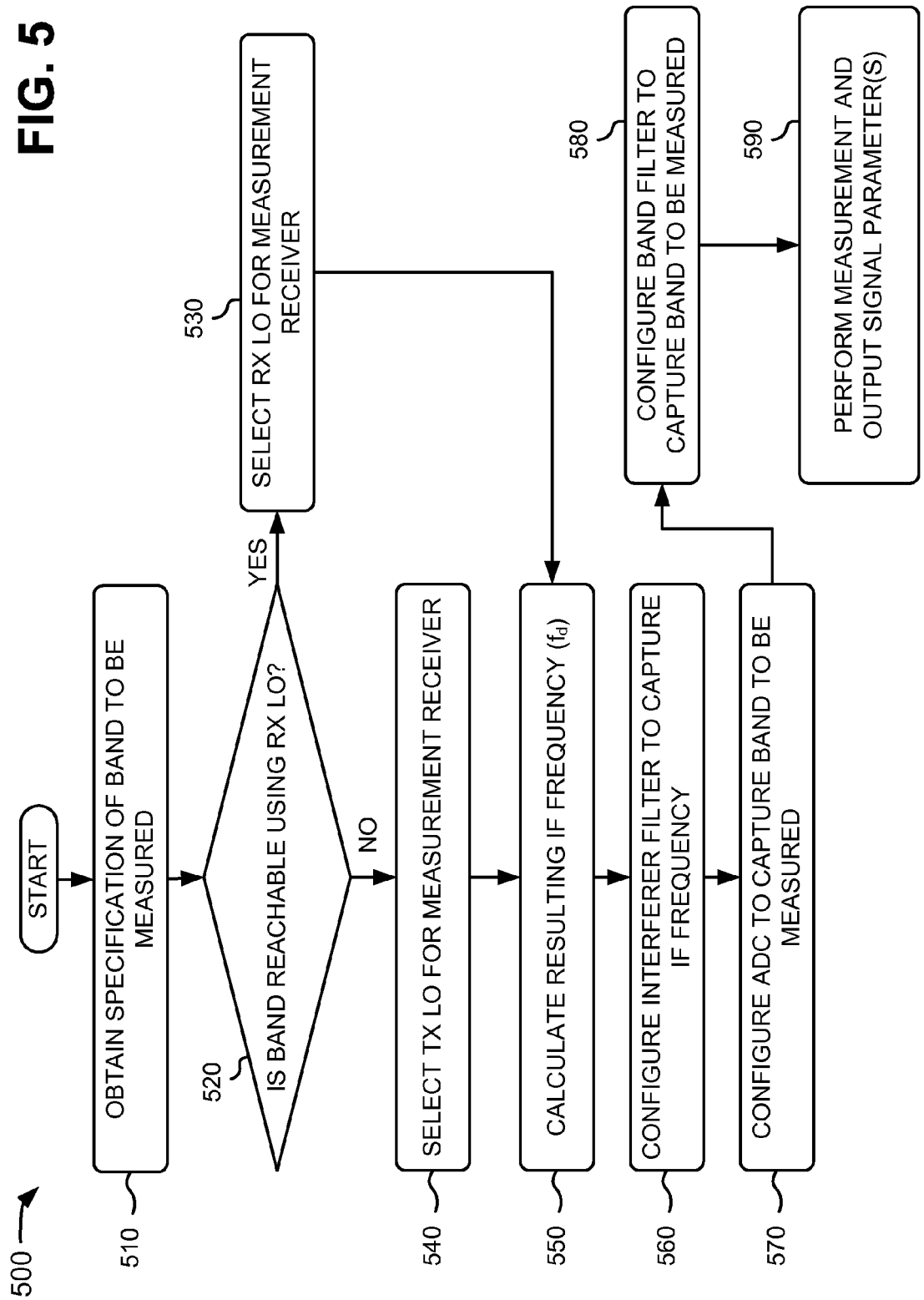

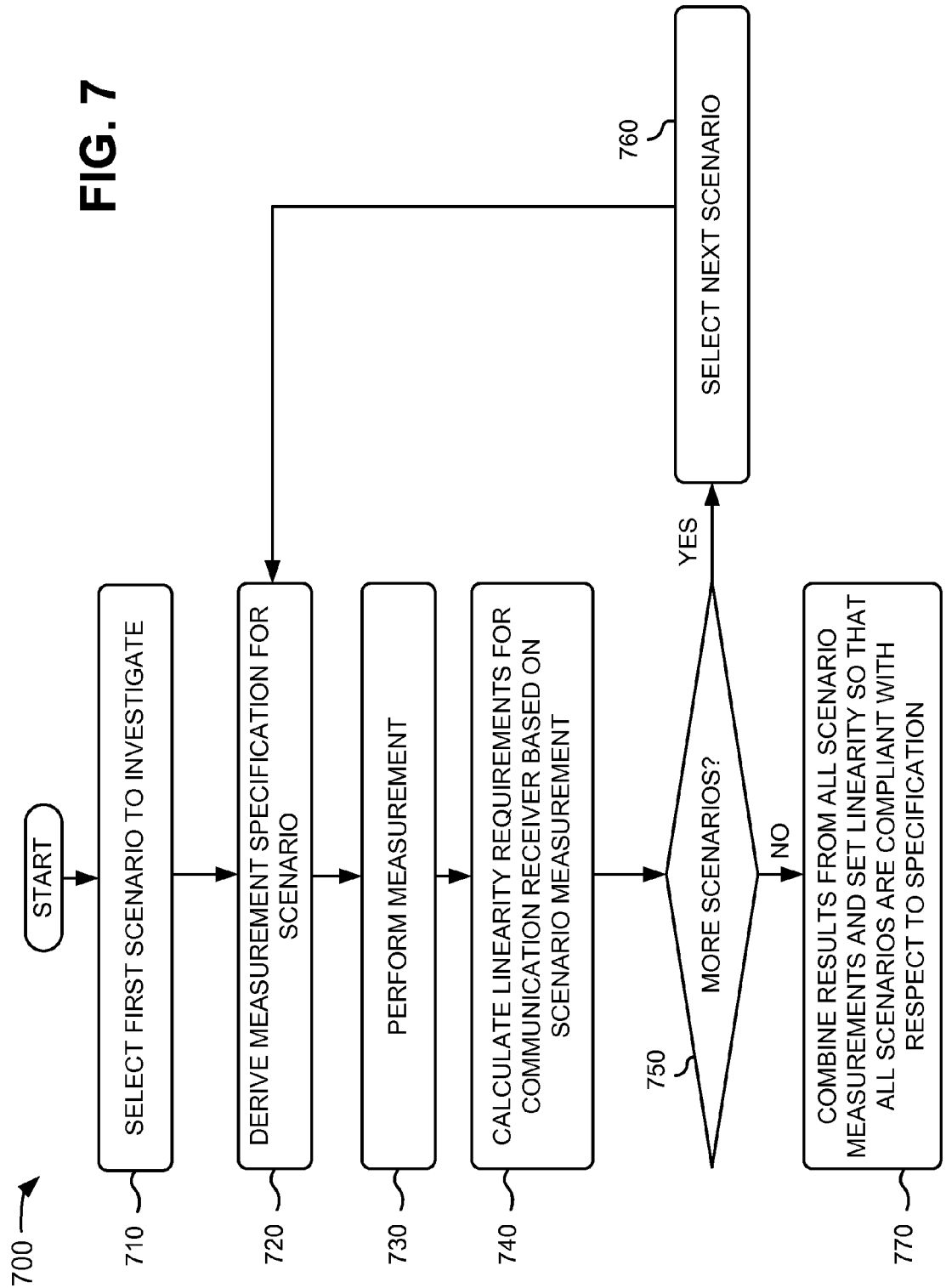

US 8,219,056 B2

RADIO ENVIRONMENT SCANNER

TECHNICAL FIELD

Embodiments described herein relate generally to communication systems, and more specifically, to techniques for mitigating interference and/or distortion in communication systems.

BACKGROUND

Receivers for cellular radio equipment are subject to large variations in the radio environment as a result of the typical No-Line-Of-Sight (NLOS) communication, the varying distance between user equipment (UE) and a base station, as well as the presence of other UEs and base stations operating in the same band. These variations manifest themselves as varying strengths and frequencies of interfering signals and varying strengths of desired signals.

As the evolution of cellular standards strive towards ever increasing throughput by using higher order modulation, extending bandwidth, using multi-antenna techniques, using new coding schemes, etc., power consumption by radio modems of UEs may increase accordingly. This, obviously, may be particularly harmful for the UE that has a limited battery capacity. Therefore, making transceivers, and the receiver part in particular, more flexible to adapt performance dynamically with respect to the varying radio environment may be a key factor for significantly reducing power consumption. To dynamically adapt performance of the transceiver, radio environment scanning may be needed. Currently, UE designs tend to set performance to handle a worst-case scenario, which may be taxing on a battery of the UE.

Cognitive radio is a concept that is applicable to wireless communication. Cognitive radio, as known in the art, involves a network and/or a wireless node (such as a UE) changing its transmission and/or reception parameters to communicate efficiently so as to optimize throughput (or other Quality of Service (QoS) metrics) and avoid interference with other devices. To change transmission and/or reception parameters, the network and/or wireless node may perform active scanning of the radio environment (known as having "radio-environment awareness").

While the above describes more general views on the need for radio environment scanners, the example below is a rather specific, but still important, example demonstrating one particular issue.

A common problem for Frequency-Division Duplex (FDD) radio transceiver equipment, with concurrent reception and transmission, is cross-modulation products generated in the receiver between a transmission (TX) signal and an interfering signal. As illustrated in FIGS. 1A and 1B, a transmission signal, from a transmitter (TX) in a particular UE, may leak through a duplex filter to an input of a receiver (RX). As shown in FIG. 1A, an interfering signal may be generated by an external interfering transmitter.

Alternatively, in those situation where the UE includes a second radio transceiver (e.g., a Bluetooth or Wide Local Area Network (WLAN) transceiver), as shown in FIG. 1B, the signal transmitted by the second radio transceiver (e.g., an interfering transceiver) may be captured by the UE antenna of the first radio transceiver (e.g., an interfered transceiver) and leaked through the duplex filter into the radio receiver of the first radio transceiver. When both the TX and interfering signals are strong, the cross-products resulting from limited linearity in the RX front-end of the receiver may fall into a desired RX band, thereby reducing a signal-to-noise ratio (SNR) of that signal. However, this situation may only happen if the interfering signal is either located at the other side of the TX signal (with respect to the RX signal) at a distance equal to a duplex distance ($f_d$) from the TX signal or exactly between the TX and RX signals, as illustrated in FIGS. 1C and 1D, respectively. In each of these situations, as illustrated in FIGS. 1C and 1D, the TX signal and interfering signal are positioned to make a cross-product appear in the RX band.

Yet another situation is shown in FIG. 1E. In FIG. 1E, the transmitter, which causes the interfering signal, may be so close to the RX signal that spectral regrowth of the signal in the radio receiver, due to the interfering signal, falls into the desired RX band. The interfering signal could either be the TX signal, when the duplex distance is very small, or an interfering signal.

The situations described above typically dictate the requirements for the linearity of the receiver front-end that has to be designed to cope with the worst-case scenario in this respect. Having a receiver design with fixed parameters designed to cope with the worst-case scenarios as discussed above will have a linearity performance and power consumption that are unnecessarily high for most scenarios. Radio environment scanners typically have to measure signals at several frequencies or at a range of frequencies. Thus, conventional radio environment scanners are associated with a dedicated radio frequency (RF) local oscillator (LO) synthesizer for down-conversion that is stepped over the frequency range of interest.

SUMMARY

It is an object of the invention to overcome at least some of the above disadvantages, and to provide a measurement receiver that can perform radio environment scanning so as to allow for dynamic tuning of a communication receiver.

An embodiment described herein may provide a device that includes a measurement receiver, a communication receiver, and a transmitter. The measurement receiver may include a receiver (RX) down-conversion component to receive an amplified signal from a low-noise amplifier of the communication receiver, selectively receive a signal from a first local oscillator associated with the communication receiver or a second local oscillator associated with the transmitter, and down-convert the amplified signal to baseband using the received signal from the first local oscillator or the second local oscillator. The measurement receiver may further include a delta-sigma analog-to-digital converter (ADC) to provide low quantization noise only for a particular frequency range to be measured. In addition, the measurement receiver may include a control component to configure the delta-sigma ADC to provide the low quantization noise at the particular frequency range.

Another embodiment described herein may provide a method for measuring a parameter of a signal in a frequency band to be investigated. The method may be performed by a device that includes a communication receiver, a transmitter, and a measurement receiver. The method may include determining whether the frequency band is reachable using a local oscillator associated with the communication receiver. The method may further include setting a switch, in the measurement receiver, to transfer a first signal from the local oscillator, associated with the communication receiver, when the frequency band is reachable using the local oscillator associated with the communication receiver, or to transfer a second signal from a local oscillator, associated with the transmitter, when the frequency band is not reachable using the local oscillator associated with the communication receiver. The method may further include configuring a delta-sigma ADC, in the measurement receiver, to capture the frequency band and configuring a band detector, in the measurement receiver, to filter the captured frequency band. The method may also include measuring the parameter based on the setting the switch, the configuring the delta-sigma ADC, and the configuring the band detector.

Systems and/or methods described herein may provide a measurement receiver that is separate or partly separate from a communication receiver used for reception of signals and uses existing RF local oscillators for down-conversion. By sharing components of the communication receiver, UE power savings can be realized and valuable chip space can be conserved. In addition, the measurement receiver may include an analog-to-digital converter (ADC) and a band detector. The measurement receiver may apply a scanning operation in a mixed-signal domain, by sweeping a noise transfer function of the ADC, and in a digital domain, by applying band-detection techniques. The measurement receiver, as described herein, may have low and/or variable gain and large bandwidth.

BRIEF DESCRIPTION OF THE DRAWINGS

FIG. 2 is a diagram of an exemplary network in which systems and/or methods described herein may be implemented;

FIG. 3 is a diagram of exemplary components of the user equipment (UE) of FIG. 2;

FIG. 4 is a diagram of exemplary components of the communication interface of FIG. 3;

FIG. 5 is a flow chart of an exemplary process for measuring one or more signal parameters according to an exemplary embodiment;

FIG. 7 is a flow chart of an exemplary process for adjusting linearity of the communication receiver of FIG. 4 according to an exemplary embodiment.

DETAILED DESCRIPTION

Figure 1A:
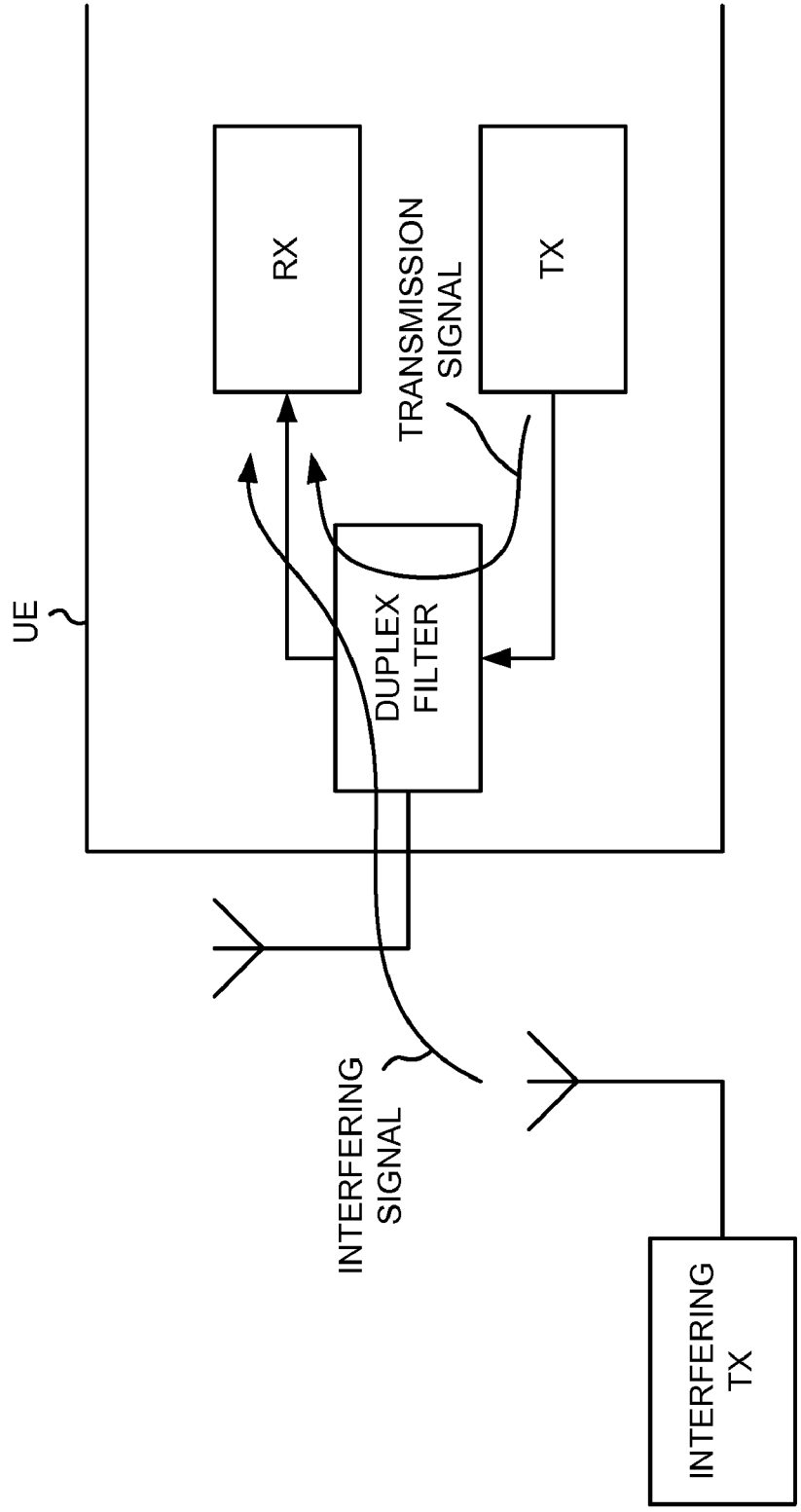
FIGS. 1A and 1B is a diagram of interference that may affect a receiver of a UE.
Figure 1B:
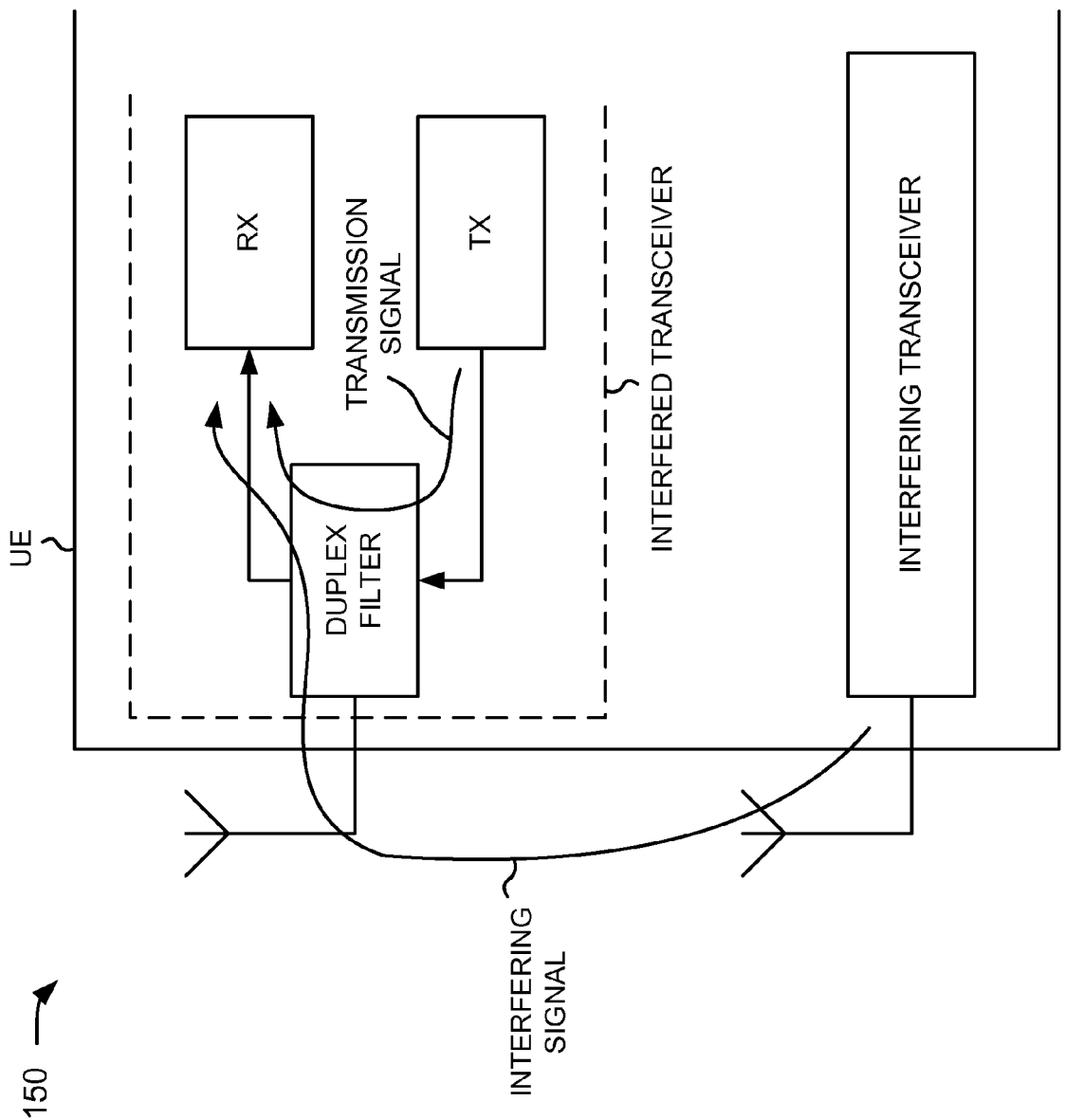
Figure 1C:
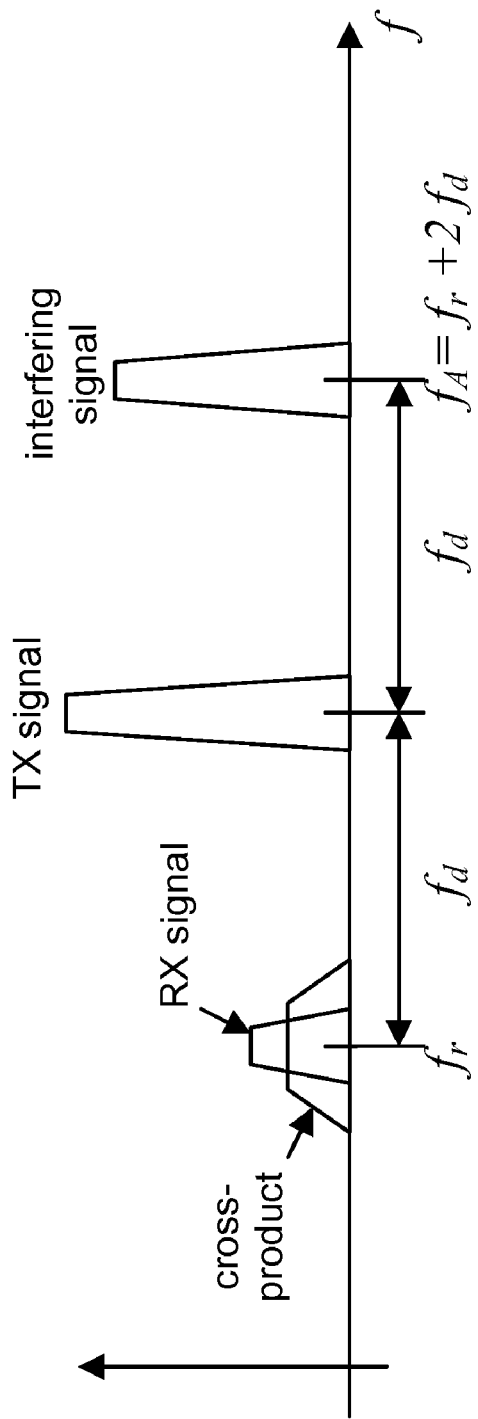
FIGS. 1C-1E are diagrams showing how a transmission signal and/or interfering signal may interfere with a received signal.
Figure 1D:
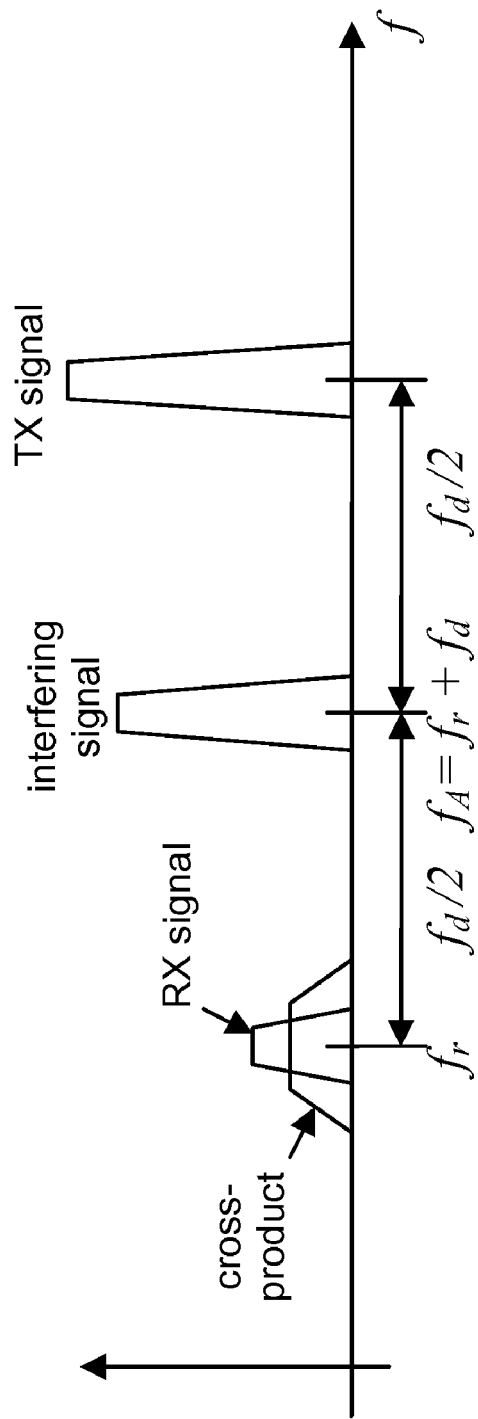
Figure 1E:
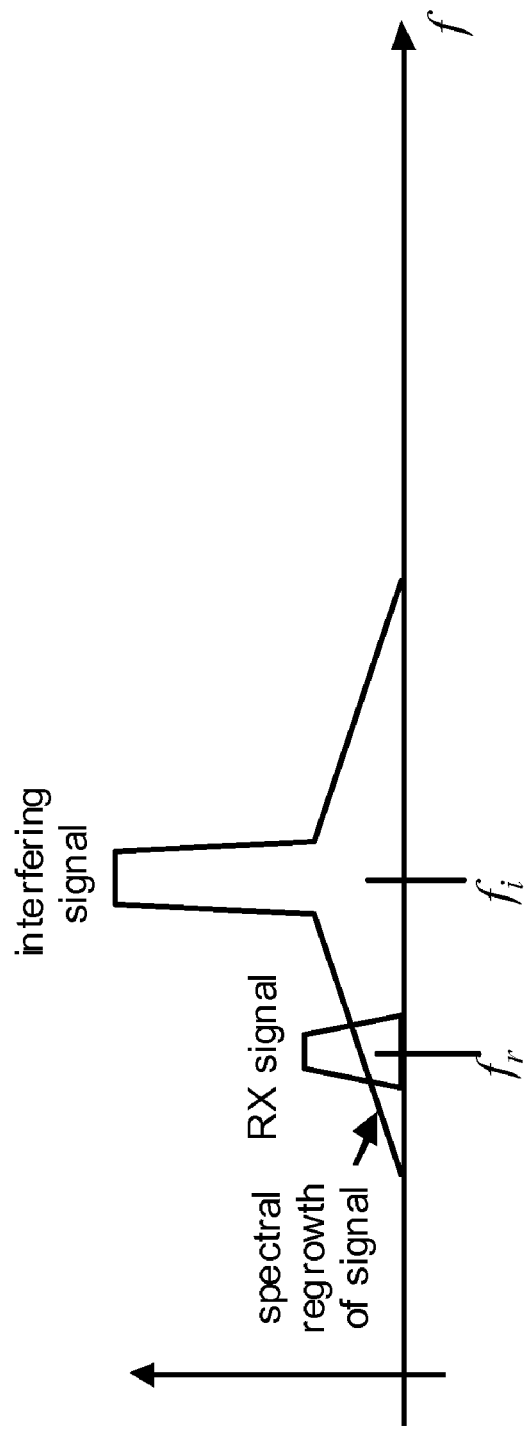

The following detailed description refers to the accompanying drawings. The same reference numbers in different drawings may identify the same or similar elements. Also, the following detailed description does not limit the invention.

Embodiments described herein may provide systems and/or methods that provide a measurement receiver architecture that can scan a range of frequencies without changing a radio frequency (RF) local oscillator (LO). In one embodiment, the measurement receiver architecture may use existing RF LO signals, which may eliminate the need to implement separate LOs. In addition, the measurement receiver architecture may perform the scanning operation in a mixed-signal domain, by altering properties of analog-to-digital converters (ADCs), and in a digital domain, by utilizing techniques for measuring signals within a desired band.

FIG. 2 illustrates a diagram of an exemplary network 200 in which systems and/or methods described herein may be implemented. As shown, network 200 may include user equipment (UE) 210 that may communicate with other UEs and/or other types of devices via a network 230. In one embodiment, UE 210 may communicate with other UEs and/or other types of devices via a base station 220 that acts as an intermediate device between UE 210 and the other UEs and/or or other types of devices. For example, as shown in FIG. 2, base station 220 may reside as an intermediate component of network 230 and may be used to facilitate end-to-end communication between UE 210 and other UEs and/or other types of devices.

UE 210 may include a mobile UE such as a cellular radiotelephone, a personal digital assistant (PDA), a Personal Communications Systems (PCS) terminal, a laptop computer, a palmtop computer, a netbook computer, or any other type of device or appliance that includes a communication transceiver that permits the device to communicate with other devices via a wireless link. A PDA may include a radiotelephone, a pager, an Internet/intranet access device, a web browser, an organizer, calendars and/or a global positioning system (GPS) receiver. A PCS terminal may combine a cellular radiotelephone with data processing, facsimile and data communications capabilities. UE 210 may be referred to as a "pervasive computing" device.

Base station 220 may include one or more devices that receive voice and/or data from a network, such as network 230, and transmit the voice and/or data to UE 210 via an air interface. Base station 220 may also include one or more devices that receive voice and/or data from UE 210 over an air interface and transmit that voice and/or data to the network or other UEs.

Network(s) 230 may include one or more networks of any type, including, for example, a local area network (LAN); a wide area network (WAN); a metropolitan area network (MAN); a telephone network, such as the Public Switched Telephone Network (PSTN) or a Public Land Mobile Network (PLMN); a satellite network; an intranet, the Internet; an Internet Protocol Multimedia Subsystem (IMS) network; or a combination of networks. The PLMN(s) may further include a packet-switched network, such as, for example, a General Packet Radio Service (GPRS) network, a Cellular Digital Packet Data (CDPD) network, or a Mobile IP network.

Although FIG. 2 shows exemplary devices and networks of network 200, in other embodiments, network 200 may include fewer, different, or additional devices and/or networks than depicted in FIG. 2.

FIG. 3 is a diagram of exemplary components of UE 210. As illustrated, UE 210 may include processing unit 310, storage 320, a user interface 330, a communication interface 340, and an antenna assembly 350. Processing unit 310 may include a processor, a microprocessor, an application specific integrated circuit (ASIC), a field programmable gate array (FPGA), or the like. Storage 320 may include a random access memory (RAM), a read only memory (ROM), and/or another type of memory to store data and instructions that may be used by processing unit 310 to control operation of UE 210 and its components.

User interface 330 may include mechanisms for inputting information to UE 210 and/or for outputting information from UE 210. Examples of input and output mechanisms might include a speaker to receive electrical signals and output audio signals, a camera to receive image and/or video signals and output electrical signals, a microphone to receive audio signals and output electrical signals, buttons to permit data and control commands to be input into UE 210, and a display to output visual information.

Communication interface 340 may include, for example, a transmitter that may convert baseband signals from processing unit 310 to radio frequency (RF) signals and a receiver that may convert RF signals to baseband signals. Alternatively, communication interface 340 may include a transceiver to perform functions of both a transmitter and a receiver. In one embodiment, communication interface 340 may include a measurement receiver that monitors signals in network 200 to, for example, adapt the performance of the receiver. Communication interface 340 may connect to antenna assembly 350 for transmission and reception of the RF signals. Further details of communication interface are provided below in connection with, for example, FIG. 4.

Antenna assembly 350 may include one or more antennas to transmit and receive RF signals over the air. Antenna assembly 350 may receive RF signals from communication interface 340 and transmit the RF signals over the air. Antenna assembly 350 may further receive RF signals over the air and provide the RF signals to communication interface 340. In one embodiment, for example, communication interface 340 may communicate with another device, such as base station 220.

Although FIG. 3 shows exemplary components of UE 210, in other embodiments, UE 210 may include fewer, different, or additional components than depicted in FIG. 3. In still other embodiments, one or more components of UE 210 may perform the tasks described as being performed by one or more other components of UE 210.

FIG. 4 is a diagram of exemplary components of communication interface 340. As illustrated, communication interface 340 may include a duplex filter 410, a communication receiver 420, a transmitter 440, a receiver (RX) local oscillator (LO) 450, a transmitter (TX) LO 460, and a measurement receiver 470.

Duplex filter 410 may include one or more tuned filters that connect to antenna assembly 350. In one embodiment, duplex filter 410 may be tuned to pass an input frequency (also called an RX band) from antenna assembly 350 to communication receiver 420 and tuned to pass an output frequency (also called a TX band) from transmitter 440 to antenna assembly 350.

Communication receiver 420 may include a low-noise amplifier 422, a receiver (RX) down-conversion component 424, a variable gain amplifier (VGA) 426, a channel filter 428, an analog-to-digital converter (ADC) 430, and a digital front-end (DF) 432. Although FIG. 4 shows exemplary components of communication receiver 420, in other embodiments, communication receiver 420 may include fewer, different, or additional components than depicted in FIG. 4. In still other embodiments, one or more components of communication receiver 420 may perform the tasks described as being performed by one or more other components of communication receiver 420.

Low-noise amplifier 422 may receive RF signals from duplex filter 410 and amplify, in a known manner, the signal strength of all the signals within the RX band to a reasonable level. RX down-conversion component 424 may receive the amplified signals from low-noise amplifier 422 and down-convert the signals, using a signal from RX LO 450, to baseband. In one embodiment, RX down-conversion component 424 may be implemented as a mixer. VGA 426 may condition the signal by, for example, raising or lowering the signals to adjust the signal strength of the signals after down conversion. Channel filter 428 may reduce the power of adjacent channel signals to reduce the dynamic range requirements for the analog-to-digital conversion. ADC 430 may convert the signals from an analog state to a digital state. DF 432 may perform additional processing of the digital data from ADC 430. The additional processing may include, for example, additional filtering, demodulation, etc.

Transmitter 440 may include a transmitter (TX) up-conversion component 442 and a power amplifier 444. Although FIG. 4 shows exemplary components of transmitter 440, in other embodiments, transmitter 440 may include fewer, different, or additional components than depicted in FIG. 4. In still other embodiments, one or more components of transmitter 440 may perform the tasks described as being performed by one or more other components of transmitter 440.

TX up-conversion component 442 may receive a signal (e.g., a modulated signal) to be transmitted by UE 210 and up-convert the signal, using a signal from TX LO 460, to a desired transmit frequency. Power amplifier 444 may receive the up-converted signal from TX up-conversion component 442 and amplify the signal to an appropriate power level. Power amplifier 444 may transmit the amplified signal to duplex filter 410 for transmission via antenna assembly 340.

RX LO 450 may include an oscillator that generates a frequency reference signal, also called an RX LO signal, which is tuned to the desired frequency at which UE 210 receives transmissions. As indicated above, RX down-conversion component 424 may down-convert the signals received from low-noise amplifier 422 to baseband using the RX LO signal.

TX LO 460 may include an oscillator that generates a frequency reference signal, also called a TX LO signal, which is tuned to the desired frequency at which UE 210 transmits signals. As indicated above, the TX up-conversion component 442 may up-convert a received signal using the TX LO signal.

Measurement receiver 470 may include an RX down-conversion component 472, an interferer filter 474, an ADC 476, a band detector 478, a switch 480, and a control component 482. Although FIG. 4 shows exemplary components of measurement receiver 470, in other embodiments, measurement receiver 470 may include fewer, different, or additional components than depicted in FIG. 4. In still other embodiments, one or more components of measurement receiver 470 may perform the tasks described as being performed by one or more other components of measurement receiver 470.

In one embodiment, measurement receiver 470 may, as illustrated in FIG. 4, share components associated with communication receiver 420. For example, measurement receiver 470 may receive the output of low-noise amplifier 422 from communication receiver 420. Sharing low-noise amplifier 422 with communication receiver 420 may not only save power (by not having to supply power to two separate low-noise amplifiers 422), but also may save valuable chip space.

In addition, measurement receiver 470 may share RX LO 450 with communication receiver 420. Again, not only does this sharing of communication receiver 420 components save power, but the sharing also saves valuable chip space. In addition, by using the same RX LO 450 that is used by communication receiver 420, the risk of spurious generation and interference between different LO sources can be avoided.

RX down-conversion component 472 may receive the amplified signal from low-noise amplifier 422 and down-convert the signal to baseband. In those situations where an LO signal from RX LO 450 is used, it will be appreciated that the output of RX down-conversion component 472 would match the output of RX down-conversion component 424 of communication receiver 420. However, implementing a dedicated RX down-conversion component 472 in measurement receiver 470 allows for different LO sources to be selected.

For example, depending on the desired frequency to be measured, an LO signal from either RX LO 450 or TX LO 460 may be selected for the down-conversion operation.

Interferer filter 474 may receive signals from RX down-conversion component 472 and may operate in the same manner as channel filter 428, namely to increase the ratio of the signal to be measured to the levels of other signals. This operation may reduce dynamic range requirements for subsequent blocks. As the frequency of the signal to be measured may vary, interferer filter 474 may need to be adjusted accordingly.

ADC 476 may convert the detected signal to a digital form. In one embodiment, ADC 476 may be implemented as a delta-sigma ADC. In this way, ADC 476 may be tailored to have a noise transfer function that can be controlled to provide sufficiently low quantization noise only for the frequency range of the interfering signals to be detected. For example, ADC 476 may operate at a very high frequency (e.g., a clock rate of several hundred megahertz or higher). ADC 476 may be configurable so as to minimize or significantly lower the quantization noise at the frequency of the down-converted interferer signal. In practice, this may include altering the position of the zeros of the noise transfer function of ADC 476 to the frequency of the interferer signal or in the vicinity thereof.

Band detector 478 may detect a signal power or other magnitude-related quantity over a desired signal. Thus, band detector 478 may isolate this signal to be measured, suppressing the quantization noise and other distortions that might have been added during the processing of the signal. In one embodiment, band detector 478 may include a band pass filter, a power detector, and/or other types of detectors that allow desired properties of the signal to be detected, such as, for example, the power and/or amplitude of the signal. For example, band detector 478 may include a filter bank and a Fast Fourier Transform (FFT). The filter bank may be derived from a low-pass filter that is shifted in frequency to match the desired frequency band. Alternatively, band detector 478 may use a method based on Discrete Wavelet Transformation (DWT), where simple decimations by two and high pass (HP)/low pass (LP) filters are used in an iterative approach to zoom in on the desired frequency band.

Switch 480 may connect either RX LO 450 or TX LO 460 to RX down-conversion component 472. In one embodiment, switch 480 may select RX LO 450 or TX LO 460 based on a signal from control component 482.

Control component 482 may control the components of measurement receiver 470. For example, control component 482 may receive information indicating the center frequency and the bandwidth at which a measurement is to be performed. The frequency and bandwidth may be associated with a transmitter (i.e., transmitter 440) that is co-located with communication receiver 420. For example, transmitter 440 may cause interference to communication receiver 420, when the transmission signal of transmitter 440 leaks into communication receiver 420 through duplex filter 410. This same problem may also appear between different transceivers. For example, a UE may include both a Long Term Evolution (LTE) transceiver and a WLAN transceiver and the transmitter of the WLAN transceiver may interfere with the receiver of the LTE transceiver. In this embodiment, the UE does not have to estimate the interference of the WLAN transmitter by measuring the interference. Instead, the WLAN transceiver can inform the LTE transceiver regarding the output power (and possibly other properties as well, such as bandwidth, modulation, etc.) being used by the WLAN transceiver, and the measurement receiver, associated with the LTE transceiver, can use this information to calculate the interference level. This calculation may be based on a model that is available when the UE is made, using certain assumptions, or the calculation can be based on knowledge obtained from earlier measurements. As an example, one important parameter that affects how severe the interference will be is the antenna coupling between the two systems (i.e., between the LTE transceiver and the WLAN transceiver). This parameter can be approximated, e.g., by assuming that the attenuation between the antennas is 15 dB, or by performing a calibration measurement, for example, at the time when the two systems are used for the first time. If the attenuation between the antennas is estimated to be 10 dB, then the measurement receiver may use this value in the subsequent interference calculations.

Depending on the carrier frequency used by the interfering system (e.g., the WLAN in the example scenario above), as well as the frequency used for transmission and reception of the victim system (e.g., the LTE receiver in the example above), degradation might be experienced because of desensitization, inter-modulation, or cross-modulation. The measurement receiver may evaluate all of these possible sources for degradation, using knowledge of the interfering system.

The situation that an interfering system is located in the same device as a victim system (e.g., an interfered system) not only allows for more accurate estimation of the power level of the interfering signal, it also allows the interfering system to signal to the victim system as to whether transmission from the interfering system is actually ongoing. Even in a Frequency Division Duplex (FDD) system, where transmission might be continuous, there are situations where transmission takes place only during a relatively small fraction of the total available time. The possibility to have knowledge of exactly when interference is an issue, allows the victim system to adapt its linearity performance on a time-scale that is on the order of the burst length of the interfering system, rather than on a time-scale of the entire session. Therefore, the required linearity of the victim system may be determined when interference is actually present. As an example, if the interfering system is a Bluetooth system that transmits, e.g., a 300 microsecond (μs) burst every 1.25 milliseconds (ms), the linearity of the victim system may be set to one (high) value during these 300 μs bursts, and to a lower value during the remaining 950 μs in order to save power. However, the linearity of the victim system may not be altered at arbitrary time instances, as this may lead to transient interference within the victim system itself. Thus, the change of linearity may also be aligned with periods where such a change is acceptable for the victim system.

Control component 482 may receive the frequency and bandwidth information (e.g., obtained as described above) from, for example, processing unit 310 and, based on this information, control component 482 may choose whether RX LO 450 or TX LO 470 is the most suitable one for use in the down-conversion operation. In addition, control component 482 may tune interferer filter 474 to the frequency of interest so as to suppress or narrow the undesired signals. Control component 482 may further configure ADC 476 to minimize the quantization noise at the frequency of interest. Control component 482 may also send information to band detector 478 to inform band detector 478 as to the particular frequency at which the signal is to be detected.

Although FIG. 4 shows exemplary components of communication interface 340, in other embodiments, communication interface 340 may include fewer, different, or additional components than depicted in FIG. 4. For example, in one embodiment, measurement receiver 470 may include a separate low-noise amplifier and be associated with a separate antenna assembly. In some embodiments, one or more components of communication interface 340 may perform the tasks described as being performed by one or more other components of communication interface 340.

FIG. 5 is a flow chart of an exemplary process 500 for measuring one or more parameters of a signal of interest according to an exemplary embodiment. In one embodiment, process 500 may be performed by UE 210 (e.g., by measurement receiver 470). In other embodiments, some or all of process 500 may be performed by another device or group of devices. Process 500 may be performed at predetermined intervals (e.g., the particular interval being adjustable based on how quickly changes occur in the radio environment) or in response to an event.

As illustrated in FIG. 5, process 500 may begin with measurement receiver 470 (e.g., control component 482) obtaining information relating to a frequency band to be measured (block 510). Measurement receiver 470 may receive the information from processing unit 310. The information may include, for example, information identifying a frequency and bandwidth to be measured. In one embodiment, the information may be based on information obtained for a co-located system (e.g., transmitter 440 or a transmitter associated with a different transceiver within UE 210), such as the output power, the bandwidth, the modulation, etc. used by the co-located system. Processing unit 310 may provide the information, relating to the frequency band to be measured, based on known information regarding communication interface 340. The known information may include, for example, the capabilities of measurement receiver 470 (e.g., the range of frequencies in which measurements can be made by measurement receiver 470) and variations of RX LO 450 and TX LO 460 (e.g., due to the location of the carriers).

Measurement receiver 470 (e.g., control component 482) may determine whether the desired frequency band is reachable using RX LO 450 (block 520). For example, control component 482 may determine whether the desired frequency band is within a predetermined distance from the frequency of RX LO 450. If the desired frequency band is within the predetermined distance, then control component 482 may determine that the desired frequency band is reachable using RX LO 450. If, on the other hand, the desired frequency band is not within the predetermined distance, then control component 482 may determine that the desired frequency band is not reachable using RX LO 450. Other techniques for selecting RX LO 450 or TX LO 460 may alternatively be used. For example, in one embodiment, control component 482 may select the LO frequency (e.g., from RX LO 450 or TX LO 460) that is closest to the desired frequency band.

If the desired frequency band is reachable using RX LO 450 (block 520—YES), control component 482 may select RX LO 450 for measurement receiver 470 (block 530). For example, control component 482 may set switch 480 so that the LO signal from RX LO 450 passes to RX down-conversion component 472. If, on the other hand, the desired frequency band is not reachable using RX LO 450 (block 520—NO), control component 482 may select TX LO 460 for measurement receiver 470 (block 540). For example, control component 482 may set switch 480 so that the LO signal from TX LO 460 passes to RX down-conversion component 472.

Figure 6A:
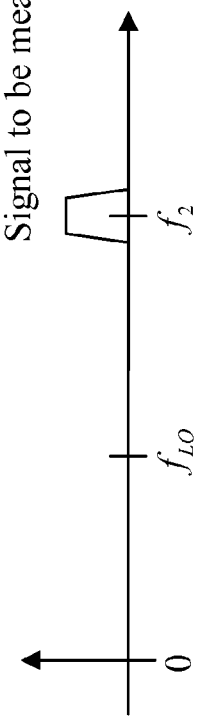
FIGS. 6A-6D are diagrams of exemplary signal relations according to the exemplary process described in FIG. 5.

In either event, measurement receiver 470 (e.g., control component 482) may calculate a resulting intermediate frequency (IF) (block 550). For example, control component 482 may determine the distance between the LO frequency (from either RX LO 450 or TX LO 460) and the frequency of the signal band to be measured. FIG. 6A illustrates exemplary relations between the intermediate frequency (depicted as $f_d$ in FIG. 6A), the LO frequency (depicted as $f_{LO}$ in FIG. 6A), and the frequency of the signal band to be measured (depicted as $f_2$ in FIG. 6A).

Figure 6B:
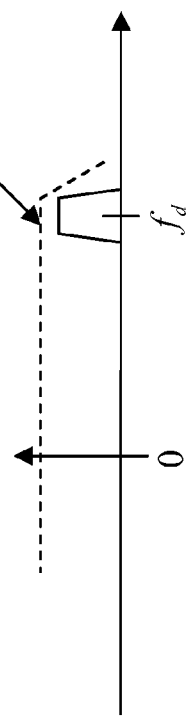

Measurement receiver 470 (e.g., control component 482) may configure interferer filter 472 to capture the intermediate frequency (block 560). In one embodiment, control component 482 may configure interferer filter 472 to be wide enough to accommodate the down-converted signal to be measured. FIG. 6B illustrates an exemplary minimum bandwidth to which interferer filter 472 may be configured.

Figure 6C:
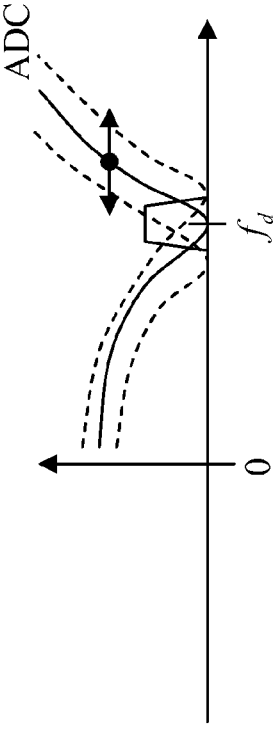

Measurement receiver 470 (e.g., control component 482) may configure ADC 476 to capture the frequency band to be measured (block 570). As indicated above, ADC 476 may be implemented as a configurable delta-sigma ADC. Control component 482 may configure ADC 476 to provide sufficiently low quantization noise only for the frequency band of the signal to be measured. For example, control component 482 may alter the position of the zeros of the noise transfer function of ADC 476 to the frequency of the signal to be measured or in the vicinity thereof. FIG. 6C illustrates the relation between the frequency band to be measured and how the noise contribution of delta-sigma ADC 476 can be configured to obtain the highest possible resolution for the frequency band of interest.

Figure 6D:
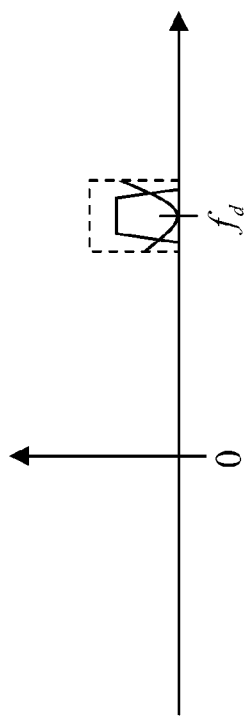

Measurement receiver 470 (e.g., control component 482) may configure band detector 478 to capture the frequency band to be measured (block 580). For example, control component 482 may configure band detector 478 to isolate the frequency band to be measured, by suppressing the quantization noise and other distortions that might have been added during the processing of the signal. FIG. 6D illustrates exemplary band-pass characteristics to which band detector 478 may be configured to measure the power of the signal within the frequency band of interest.

Once all the components of measurement receiver 470 have been configured for the measurement, measurement receiver 470 may perform the measurement (block 590). For example, RX down-conversion component 472 may receive an amplified signal from low-noise amplifier 422 and an LO signal (through switch 480) from either RX LO 450 or TX LO 460. RX down-conversion component 472 may down-convert the amplified signal to baseband using the LO signal, for example, as illustrated in FIG. 6B. Interferer filter 474 may increase the ratio of the signal to be measured to the levels of other signals. ADC 476 may process the signals from interferer filter 474 to provide sufficiently low quantization noise only for the frequency range of the signal to be measured, for example, as illustrated in FIG. 6C. Band detector 478 may isolate the signal to be measured, for example, as illustrated in FIG. 6D. Band detector 478 may measure the isolated signal to output, for example, the power and/or amplitude of the signal of interest (block 590).

The measurement made by measurement receiver 470 may be used for a variety of purposes. For example, based on the measurements of measurement receiver 470, parameters, such as gain, linearity, steepness of filters, phase noise of RX LO 450 and/or TX LO 460, etc. may be tuned on the fly to provide good receiver performance at any given instance in time. In this way, UE 210 may be configured to operate at optimum performance, as opposed to the worst-case scenario of conventional UEs, which can result in a significant reduction of power consumption.

FIG. 7 is a flow chart of an exemplary process 700 for adjusting linearity of communication receiver 420 according to an exemplary embodiment. In one embodiment, process 700 may be performed by UE 210. In other embodiments, some or all of process 700 may be performed by another device or group of devices.

As illustrated in FIG. 7, process 700 may begin with selection of a first scenario to investigate (block 710). UE 210 may determine that a number of interfering signals need to be investigated. For example, UE 210 may measure power and possibly other properties, such as the bandwidth of interfering signals and signals from transmitters within UE 210 so as to allow for dynamic adjustment of the linearity of communication receiver 420, as the properties of interferers and transmission signals change. Selection of the first scenario may include identification of a frequency and bandwidth to investigate. In one embodiment, UE 210 may use information regarding transmitter 440 and/or a co-located transmitter to identify the frequency and bandwidth to investigate.

UE 210 may derive a measurement specification for the selected first scenario (block 720). For example, UE 210 (e.g., control component 482) may, as set forth above with respect to FIG. 5, select an appropriate LO (e.g., RX LO 450 or TX LO 460), calculate the resulting intermediate frequency ($f_d$), and configure interferer filter 474, ADC 476, and band detector 478 for performing the measurement.

UE 210 may perform the appropriate measurement for the selected first scenario (block 730). For example, as set forth above with respect to FIG. 5, RX down-conversion component 472 may receive an amplified signal from low-noise amplifier 422 and an LO signal (through switch 480) from either RX LO 450 or TX LO 460 and may down-convert the amplified signal to baseband using the LO signal. Interferer filter 474 may increase the ratio of the signal to be measured to the levels of other signals and output filtered signals. ADC 476 may process the signals from interferer filter 474 to provide sufficiently low quantization noise only for the frequency range of the signal to be measured. Band detector 478 may isolate the signal to be measured and may, for example, measure a number of different parameters, such as signal strength, power, etc.

UE 210 may calculate linearity requirements for communication receiver 420 based on the scenario measurement (block 640). For example, UE 210 (e.g., processing unit 310) may determine the linearity requirements for communication receiver 420 using the parameters, measured by measurement receiver 470, for the signal of interest in the first scenario.

Once the linearity requirements for communication receiver 420 are calculated, UE 210 may determine whether any other scenarios need to be investigated (block 750). For example, as indicated above, UE 210 may determine that a number of different interfering signals need to be measured. If UE 210 determines that another scenario needs to be investigated (block 750—YES), UE 210 may select the next scenario to investigate (block 760) and processing may return to block 720 with UE 210 deriving a measurement specification for the next scenario.

If, on the other hand, UE 210 determines that no other scenarios need to be investigated (block 750—NO), UE 210 (e.g., processing unit 310) may combine results from all scenario measurements and set the linearity of communication receiver 420 so that all scenarios are compliant with respect to a specification (block 770). For example, UE 210 may tune parameters, such as gain, linearity, steepness of filters, phase noise of RX LO 450 and/or TX LO 460, etc. to account for the scenario measurement results.

The following provides a simple example illustrating the processing described above with respect to FIG. 7. In this example, assume that the purpose of measurement receiver 470 is to provide input for linearity control of communication receiver 420 (e.g., linearity of low-noise amplifier 422). Assume, for example, that a scenario exists where there is a transmission signal from transmitter 440 or from a co-located transmitter within a different transceiver. Thus, the position of the receiver (RX) band and the position of the transmission signal frequency are known. Based on the known information regarding the receiver band and the transmission signal, UE 210 may determine that a measurement on frequency $f_A$ (shown in FIG. 8) is needed for the present scenario. UE 210 may make this determination because a strong component at frequency $f_A$ would result in cross-modulation ending up in the receiver band. Assume that the non-linearity of low-noise amplifier 422 can be modeled using, for example, a third order polynomial. If it is further assumed that the third order product will be the dominant one, the following polynomial may be considered:

$$s_{out} = a_1 \cdot s_{in} + a_3 \cdot s_{in}^3$$

where $$s_{in} = s_{RX} + s_{TX} + s_{interferer}.$$

For the cross-modulation scenario, if it is also assumed that the transmission and interfering signals can be approximated by sinusoids, the power that falls into the RX band due to cross-modulation may be easily calculated, and the required linearity of low-noise amplifier 422 can be determined.

Further scenarios may be investigated that, for example, also consider the bandwidths of the transmission and interfering signals, as this could result in less cross-modulation power falling into the desired receiver band. This is particularly true when the bandwidths of the transmission and interfering signals are larger than the receiver channel bandwidth.

It will be appreciated that the use of a third order polynomial model, as described above, is for explanatory purposes only. In other embodiments, more elaborate models could be used, including higher order polynomials and empirical models of the receiver nonlinearity based on measurements with various combinations of transmission and interfering signal modulations, power, and bandwidth.

Figure 8:
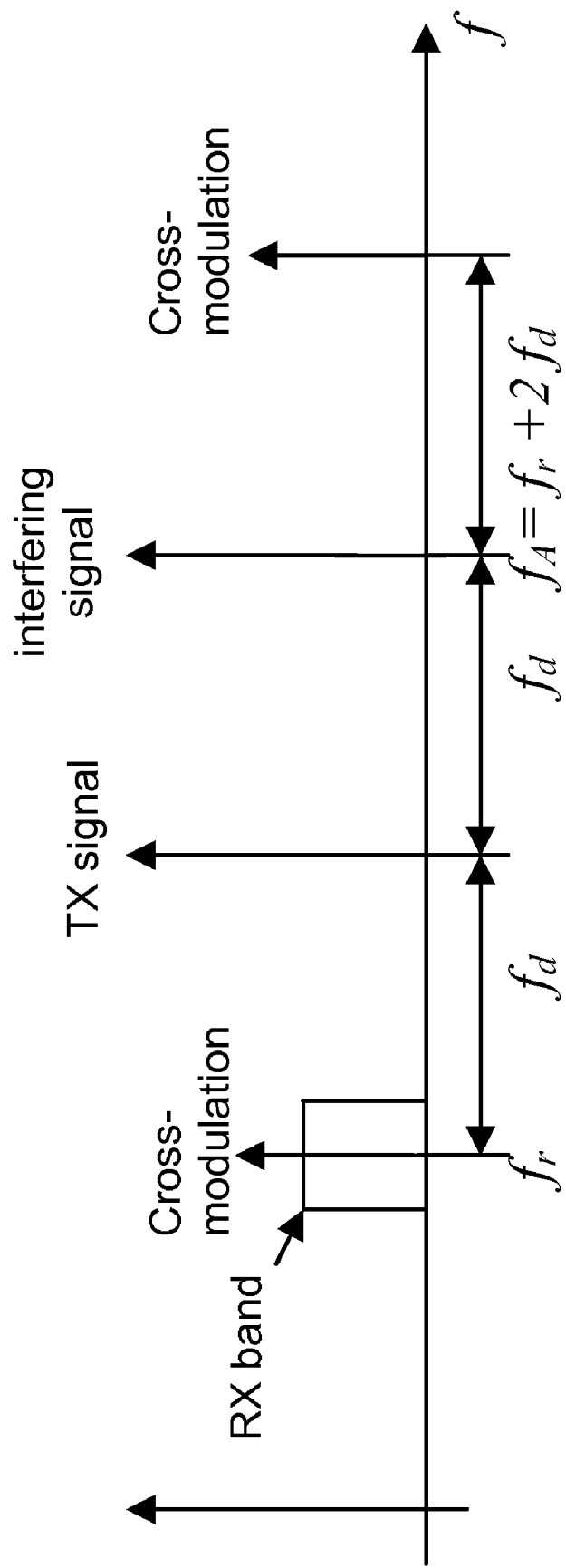
FIG. 8 is a diagram of exemplary signal relations according to the exemplary process described in FIG. 7.

Correspondingly, for the inter-modulation scenario, it may be assumed that a single interferer may be modeled by two sinusoids and spaced such that the third-order inter-modulation falls into the desired receiver band, i.e. the model of the transmission and interferer signals shown in FIG. 8 may be reused, but now having two sinusoids that combined will have a power level equal to the interferer.

Again, further scenarios may be investigated that, for example, also consider the bandwidth and the center frequency of the interfering signal, as this could result in less inter-modulation power falling into the desired receiver band. For example, it is well known in the art that the power that falls in the RX band can be easily calculated, assuming that a low-order polynomial non-linearity and a band-limited Gaussian noise signal are good approximations.

Systems and/or methods described herein provide a measurement receiver architecture that can scan a range of frequencies, without changing the RF LO. The measurement receiver architecture uses existing RF LO signals. Moreover, the measurement receiver architecture performs the scanning operation in the mixed-signal domain, by altering the properties of the ADCs, and in the digital domain, by utilizing techniques for measuring signals within a desired band.

The measurement receiver, as described above, may perform the following functions: sensing signals affecting the performance requirements for transceivers to enable adaptive radio circuits, and thereby achieve reduction of power consumption; sensing the radio environment for cognitive or cognitive-like radio communication schemes to identify free bands and properties, in general, within a given frequency range; and sensing signals causing inter-modulation distortion or cross-modulation together with a TX signal that in turn appear as co-channel interference for the receiver, thereby enabling adaptive radio circuits that provide linearity sufficient to avoid such co-channel interference.

Moreover, as described herein, the measurement receiver may provide a linearity control mechanism for a communication receiver that is based on measuring properties of interfering signals and, if applicable, may use properties about signals from co-located transmitters (instead of measuring) to estimate and set the required linearity for the communication receiver. Thus, the linearity control mechanism may alter the linearity of a communication receiver between at least two states based on a known activity from a co-located transmitter.

The foregoing description of embodiments provides illustration and description, but is not intended to be exhaustive or to limit the invention to the precise form disclosed. Modifications and variations are possible in light of the above teachings or may be acquired from practice of the invention. For example, while the above description is focused on implementing a measurement receiver in a UE, it will be appreciated that the measurement receiver may additionally or alternatively be implemented in another device, such as a base station.

In addition, the representation of signal paths by single wires and components by single blocks was provided for explanatory purposes only. It will be appreciated that such a single wire or block may represent a set of physical signals or blocks, respectively, as necessary. For example, a single RF signal down-converted using a quadrature down-conversion mixer will result in a complex-baseband signal with two real-valued signals (I and Q) and often signals are represented by two physical signals (differential signal representation).

While a series of blocks has been described with regard to FIGS. 5 and 7, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A measurement receiver in a device that includes a communication receiver and a transmitter, the measurement receiver comprising:
    a receiver (RX) down-conversion component to:
        receive an amplified signal from a low-noise amplifier of the communication receiver,
        selectively receive a signal from a first local oscillator associated with the communication receiver or a second local oscillator associated with the transmitter, and
        down-convert the amplified signal to baseband using the received signal from the first local oscillator or the second local oscillator;
    a delta-sigma analog-to-digital converter (ADC) to:
        provide low quantization noise only for a particular frequency range to be measured, and
    a control component to:
        configure the delta-sigma ADC to provide the low quantization noise at the particular frequency range.

2. The measurement receiver of claim 1, further comprising:
    a switch that connects to the first local oscillator, the second local oscillator, and the RX down-conversion component, the switch to:
    receive a control signal, and
    connect the first local oscillator or the second local oscillator to the RX down-conversion component based on the received control signal.

3. The measurement receiver of claim 2, where the control component is further to:
    receive information identifying the particular frequency to be measured, and
    send the control signal to the switch based on the received information.

4. The measurement receiver of claim 3, where the information identifying the particular frequency to be measured is determined based on a transmit frequency of the transmitter.

5. The measurement receiver of claim 3, where the device further includes a second transmitter, and
    where the information identifying the particular frequency to be measured is determined based on a transmit frequency of the second transmitter.

6. The measurement receiver of claim 1, further comprising:
    a band detector connected to an output of the delta-sigma ADC, the band detector to:
        measure a signal power at the particular frequency range.

7. The measurement receiver of claim 6, where the control component is further to:
    provide information to the band detector regarding the particular frequency range.

8. The measurement receiver of claim 1, further comprising:
    an interferer filter connected to the RX down-conversion component and the delta-sigma ADC, the interferer filter to:
        receive the baseband signal from the RX down-conversion component, and
        filter the received baseband signal to produce a filtered signal.

9. The measurement receiver of claim 8, where the control component is further to:
provide information to the interferer filter regarding the particular frequency range.

10. A method for measuring a parameter of a signal in a frequency band to be investigated, the method being performed by a device that includes a communication receiver, a transmitter, and a measurement receiver, the method comprising:
determining whether the frequency band is reachable using a local oscillator associated with the communication receiver;
setting a switch, in the measurement receiver, to transfer a first signal from the local oscillator associated with the communication receiver when the frequency band is reachable using the local oscillator associated with the communication receiver or to transfer a second signal from a local oscillator associated with the transmitter when the frequency band is not reachable using the local oscillator associated with the communication receiver;
configuring a delta-sigma analog-to-digital converter (ADC), provided in the measurement receiver, to capture the frequency band;
configuring a band detector, provided in the measurement receiver, to filter the captured frequency band; and
measuring the parameter based on the setting of the switch, the configuring of the delta-sigma ADC, and the configuring of the band detector.

11. The method of claim 10, where the switch transfers the first signal or the second signal to a receiver (RX) down-conversion component in the measurement receiver, and
where the measuring includes:
down-converting a signal, from a low-noise amplifier provided in the communication receiver, to baseband using the transferred first signal or second signal.

12. The method of claim 10, where the measurement receiver includes an interferer filter that connects to an input of the delta-sigma ADC, and
where the method further includes:
calculating an intermediate frequency using the frequency band and a frequency of one of the first signal or the second signal, depending on the setting of the switch; and
configuring the interferer filter to capture the intermediate frequency.

13. The method of claim 10, further comprising:
identifying the frequency band to be investigated based on a frequency used by the transmitter.

14. The method of claim 10, further comprising;
identifying the frequency band to be investigated based on a frequency used by a different transmitter that is located in the device.

15. The method of claim 10, where the parameter includes a power of the signal or an amplitude of the signal.

16. The method of claim 10, further comprising:
using the measured parameter to tune at least one of a gain of the communication receiver, a linearity of the communication receiver, a steepness of at least one filter within the communication receiver, or a phase noise of at least one of the local oscillator associated with the communication receiver or the local oscillator associated with the transmitter.

17. The method of claim 10, further comprising:
re-performing the measuring the parameter to allow for dynamic tuning of the communication receiver.

18. A user equipment comprising:
a transmitter;
a communication receiver;
a first local oscillator to generate a first signal at a first frequency, the first local oscillator being associated with the transmitter;
a second local oscillator to generate a second signal at a second frequency, the second local oscillator being associated with the communication receiver; and
a measurement receiver to measure a parameter associated with an interfering signal, the measurement receiver comprising:
a receiver (RX) down-conversion component configured for receiving signals from the communication receiver and from the transmitter and down-converting a signal received from the communication receiver based on a selected one of a signal received from the transmitter and another signal received from the communication receiver;
a delta-sigma analog-to-digital converter (ADC) to provide low quantization noise only for a frequency with which the interfering signal is associated; and
a control component to configure the delta-sigma ADC to provide the low quantization noise at the frequency to allow the measurement receiver to measure the parameter.

19. The user equipment of claim 18, where the measurement receiver shares the first local oscillator with the communication receiver, and
where the measurement receiver shares the second local oscillator with the transmitter, and
where the control component is further to:
cause the first local oscillator or the second local oscillator to be connected to the RX down-conversion component based on the first frequency, the second frequency, and the frequency with which the interfering signal is associated.

20. The user equipment of claim 18, further comprising:
a band detector connected to an output of the delta-sigma ADC, the band detector to:
measure a signal power at the frequency, and
where the control component is further to:
provide information to the band detector regarding the frequency.

* * * * *